April 4, 1967 — G. P. KNAPP — 3,312,414
WEB TENSIONING DEVICE

Filed Jan. 21, 1965 — 6 Sheets-Sheet 1

INVENTOR.
GEORGE P. KNAPP
BY
Kenway, Jenney & Hildreth
ATTORNEYS

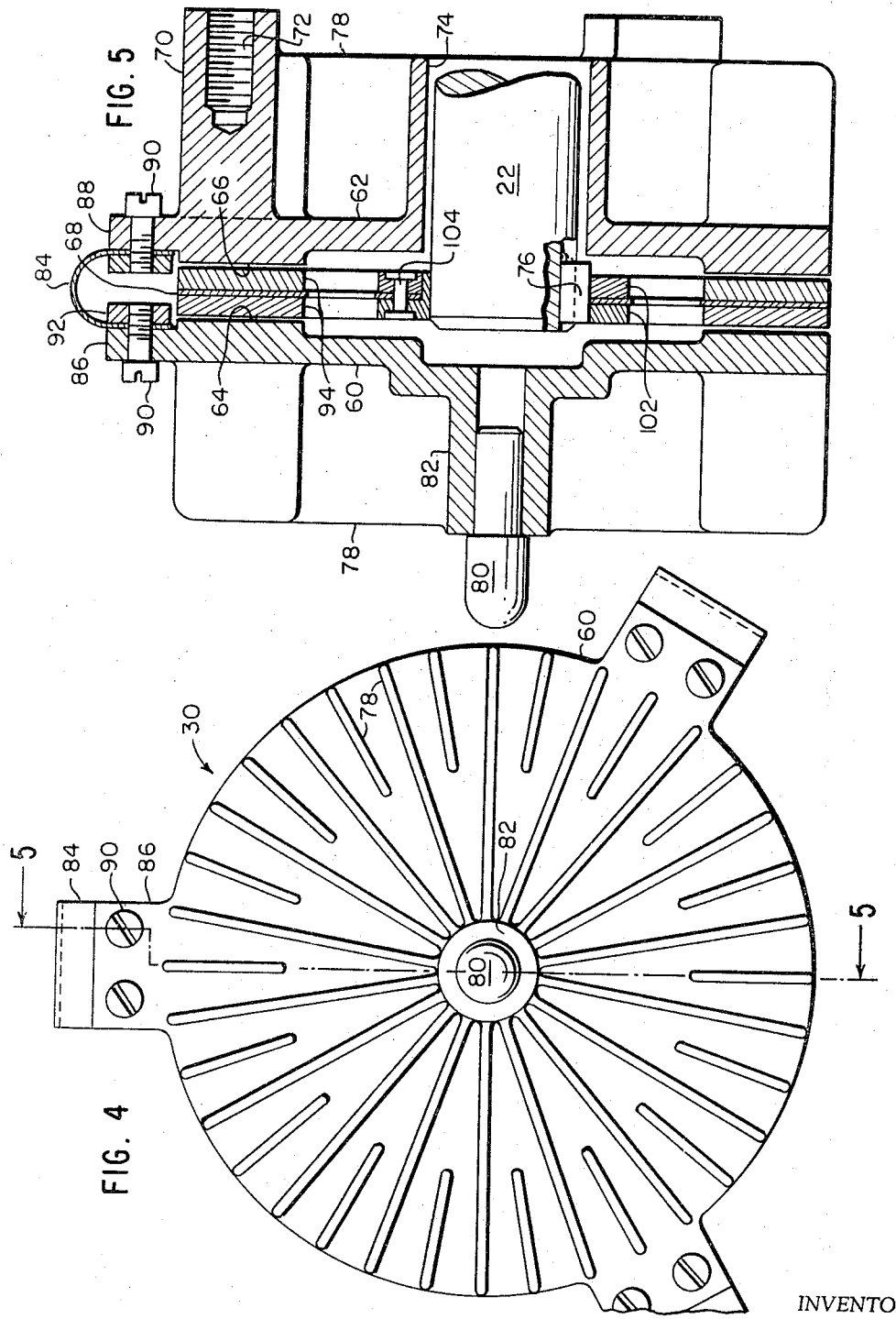

April 4, 1967  G. P. KNAPP  3,312,414
WEB TENSIONING DEVICE
Filed Jan. 21, 1965  6 Sheets-Sheet 3

INVENTOR.
GEORGE P. KNAPP
BY
Kenway, Jenney & Hildreth
ATTORNEYS

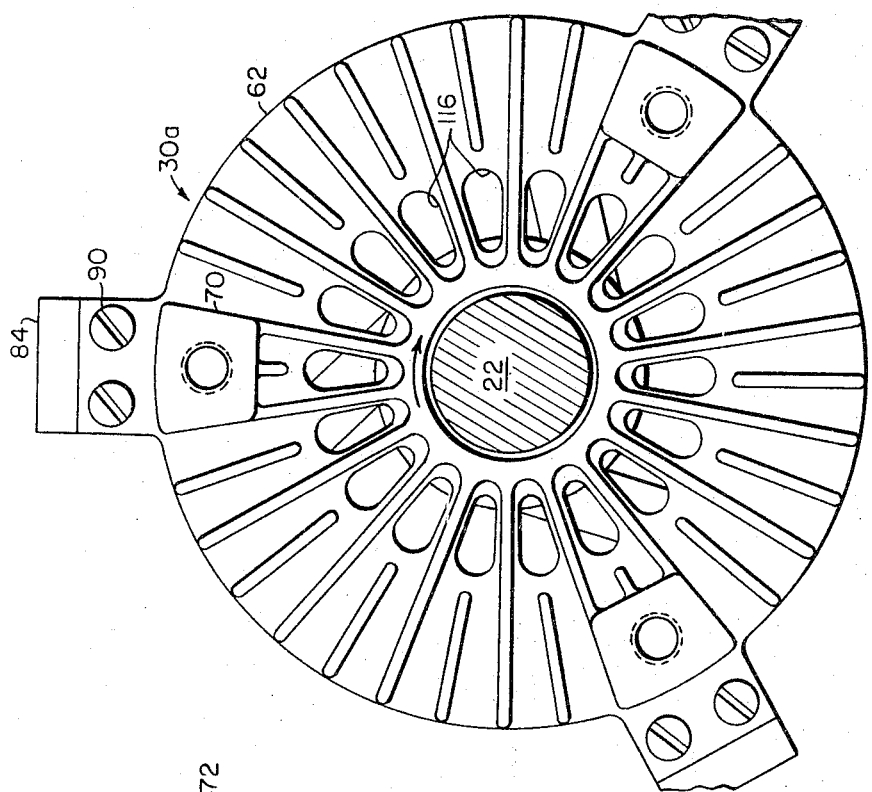
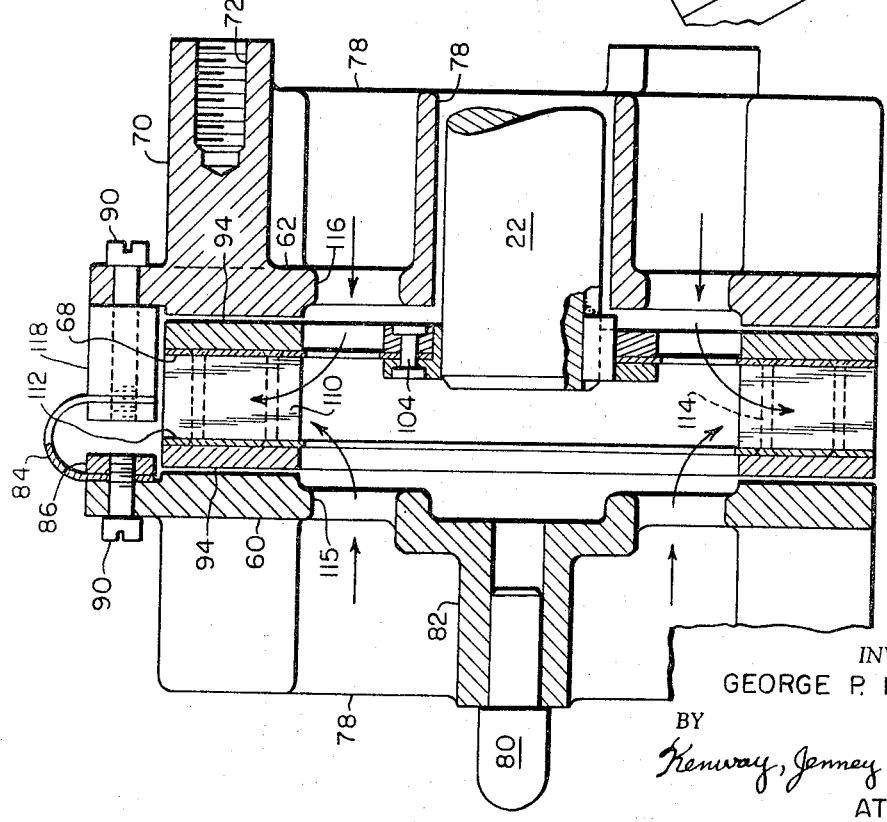

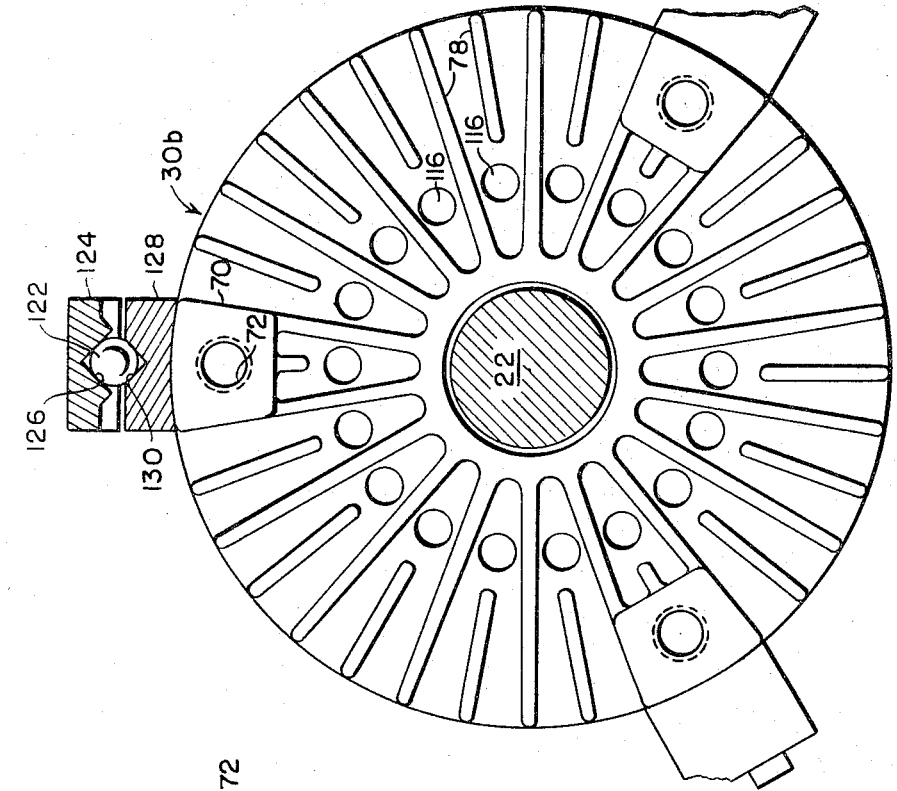
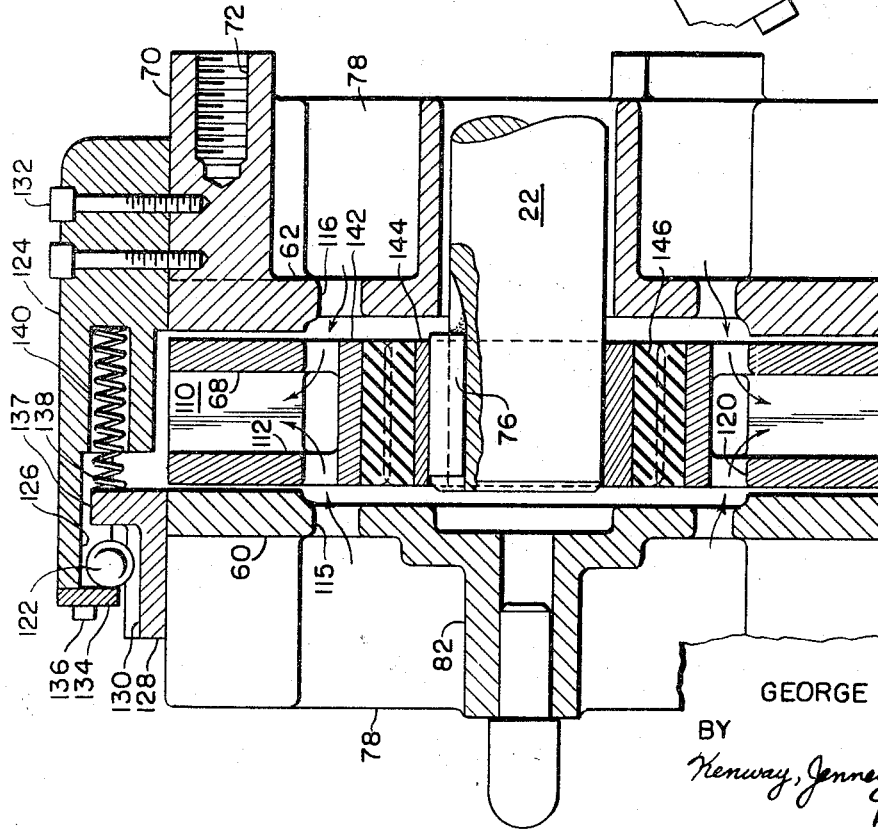

United States Patent Office 3,312,414
Patented Apr. 4, 1967

3,312,414
WEB TENSIONING DEVICE
George P. Knapp, Waban, Mass., assignor to Mount Hope Machinery Company, Taunton, Mass., a corporation of Massachusetts
Filed Jan. 21, 1965, Ser. No. 429,942
9 Claims. (Cl. 242—75.2)

This application is a continuation-in-part of my copending United States patent application Ser. No. 268,174 filed Mar. 26, 1963 and entitled, "Web Tensioning Device," now abandoned.

This invention relates to an improved web tensioning device having braking means for applying a controllable tension to a traveling web. It is the primary object of the invention to provide an improved web tensioning device in which the braking torque is more nearly uniform than in previously-known devices serving the same function. It is a further object of the invention to reduce pulsations in braking torque which arise from "run-out," i.e., deviation from a regular surface configuration arising from wear or limitations of manufacturing accuracy, in disc brake drums. It is another object of the invention to provide means for applying more nearly uniform and equal braking torque to each roll of a set comprising a web tensioning device. It is another object of the invention to reduce fluctuations in web tension, which arise from run-out of the rolls of a web tensioning device, or from friction in movable mountings of the brake drums and in splines or other driving connections between the roll axles and braking means of such a device. It is still a further object of the invention to provide an improved disc brake which affords an increased heat-horsepower rating without resort to liquid cooling. Further objects and advantages of the invention will appear as the following description proceeds.

A conventional web tensioning device of the general type with which the invention is particularly concerned may comprise three parallel rolls in a triangular arrangement; a traveling web is wrapped serially about each roll with a substantial arcuate wrap to prevent slippage. The rolls are geared together, and an adjustable brake is drivingly connected with the rolls through the gearing to apply a controllable braking torque, and thus tension the web as it is drawn forwardly to a web-processing device. However, this arrangement exhibits torque pulsations which are undesirable, and may make the device unusable in critical installations, such, for example, as a multicolor printing operation on a relatively stretchable web. In installations where there is a long span between the tensioning device and the following web treatment apparatus, the speed of the rolls of a conventional tension device handling a stretchable web may fluctuate violently with each revolution. This action alternately stretches and relaxes the web. The device may actually break a non-stretchable web in a severe case of torque pulsation. In some extreme cases, this action is believed to have caused failure of parts of the tensioning device itself.

This pulsating torque characteristic appears to have several causes. Run-out of the tension rolls, that is, deviation of the rolls from a truly concentric cylindrical form resulting from limitations of manufacturing accuracy, causes the surface speed of each roll, over the arcuate portion wrapped by the web, to fluctuate; furthermore, the surface speeds of the various rolls will consequently vary from one another when the rolls are geared together in the conventional manner. Typically, a four inch diameter tension roll may have an eccentricity or run-out at its center of up to .015 inch, and this contributes substantially to the aforementioned difficulties. Pulsations in braking torque and web tension may also be caused by run-out of the brake drums, occasioned by wear or by the practical limits of manufacturing technique. Another contributing cause may be friction in the splines which conventionally mount the brake disc amid a movable one of the brake drums, for actuation by axial movement into frictional engagement and for accommodation of wear. When there is run-out of the braking surfaces, the sliding movement of these splines absorbs a fluctuating portion of the actuating force, and causes a corresponding fluctuation in brake torque.

Briefly stated, according to preferred embodiment thereof, I may carry out my invention in part by providing a disc brake of improved design for use in a web tensioning device. In one form, the improved brake includes an axially flexible disc element for transferring brake torque to a roll axle, and received between a pair of drums having radial surfaces, which are relatively movable along the brake axis to grip the brake disc frictionally. I secure the two drums together with axially-extensible interconnecting means. In one embodiment, these comprise peripherally-spaced leaf springs for restraining one of the drums with respect to the other, which is mounted on the machine frame. In another embodiment, ball-and-track arrangements provide torsional restraint, while permitting relative axial and canting movement of the drums.

These means cooperate with the axially-flexible disc element to permit the drums and the disc to cant relative to one another for accommodating run-out of the braking surfaces, and thus maintain uniform torque. This construction allows axial motion to occur without loss of brake actuating force. At the same time, sufficient restraint against relative angular displacement is afforded to withstand a relatively large braking torque. The disc element may be a flexible structure of itself, or may be a relatively rigid element mounted on the roll axle by means which are axially flexible to permit the disc to cant.

My invention further contemplates the provision of a web tensioning device in which each tension roll of a parallel set is provided with an individual brake, and in which actuating means for the brakes are arranged to apply equal braking forces to each member of the group. By these means, uniform torque is applied to each roll, and the aforementioned problems arising from gearing the rolls together are avoided. In a preferred embodiment, three rolls are provided, and the brakes are energized by a flexible diaphragm driving a rigid spider which pivotally engages an actuating stud of each brake. The center of pressure of the diaphragm coincides with the center of gravity of a triangle defined by the actuating studs; the braking force applied to each brake is thus equalized, further contributing to the realization of equal and uniform braking torque application to all of the rolls.

While the specification concludes with claims distinctly pointing out the subject matter which I regard as my invention, it is believed that a clearer understanding may be gained from the following detailed description of preferred embodiments thereof, referring to the accompanying drawings, in which:

FIG. 4 is an end view in elevation of a first form of an improved disc brake utilized in the web tensioning device;

FIG. 5 is a sectional view taken along line 5—5 in FIG. 4, looking in the direction of the arrows;

FIG. 7 is a cross-sectional view in elevation of a second form of the improved disc brake;

FIG. 8 is an end view in elevation of the brake of FIG. 7;

FIG. 10 is a cross-sectional view of a third form of the improved disc brake;

FIG. 11 is an end view partially in section, of the brake of FIG. 10; and

Figure 2:
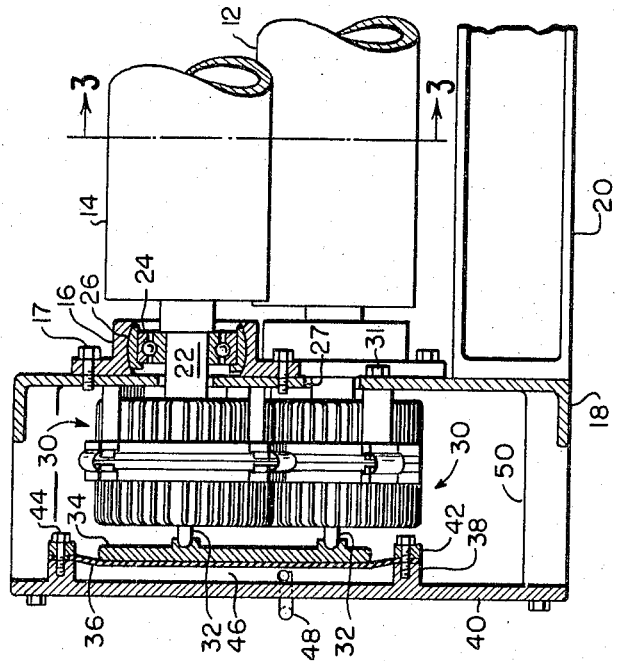
FIG. 2 is a sectional view taken along line 2—2 in FIG. 1, looking in the direction of the arrows.
Figure 1:
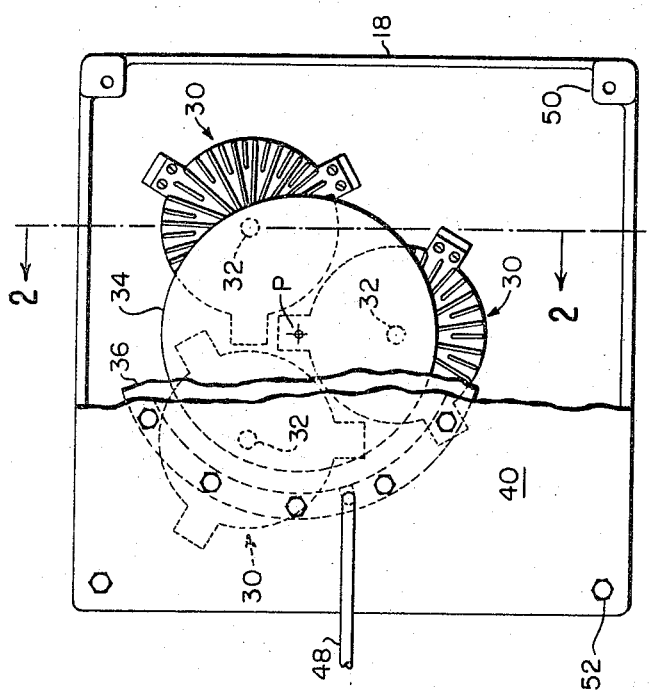
FIG. 1 is an end view in elevation of a preferred form of the improved web tensioning device, with parts broken away to show interior construction.
Figure 3:
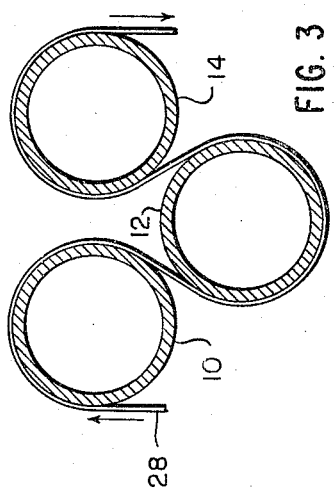
FIG. 3 is a sectional view taken along line 3—3 in FIG. 2, showing a traveling web wrapped on the rolls of the tensioning device.

Referring to FIGS. 1–3, a preferred embodiment of the improved web tensioning device is shown, in which a parallel array of three tensioning rolls 10, 12, and 14 are rotatably mounted by means of capsule bearing units 16, secured by screws 17 in a stationary framework comprising a brake housing 18, a transverse beam 20 which may be welded to the brake housing, and a bearing support (not shown) for the opposite ends of the rolls. Each roll has a stub shaft 22 affixed thereto and received in a ball bearing unit 24, which is in turn mounted in a spherical bearing 26 to accommodate any flexure or sagging of the rolls, which may be quite lengthy. The brake housing is formed with openings 27 for receiving the roll shafts 22 therein. The rolls are arranged in serial order by a traveling web 28, so that the web wraps a substantial arcuate portion of each roll and relative slippage is prevented.

In a conventional device of this general type, the rolls are geared together and an adjustable brake is drivingly connected with the rolls through the gearing, to apply a controlled degree of tension. As previously pointed out, however, unavoidable run-out of eccentricity of rolls which are positively interconnected by gearing would result in inequality of the surface speed of the rolls, with alternate stretching and slacking of the web.

To overcome this difficulty, I provide a separate brake 30 for each roll, together with means for simultaneously energizing each of the brakes with equal actuating forces. The brakes are mounted in the housing 18 by means of screws 31. The brakes shown are preferably of an improved disc type to be more fully described hereinafter, and each is energized by applying a force along the roll axis through actuating stud 32. To equalize the actuating forces, a spider or pressure plate 34 pivotally engages each of the studs, and means are provided to apply an actuating force at the center of gravity P of the triangle defined by the three studs. In the preferred form, these means comprise a flexible diaphragm 36 whose center of pressure is located at the point P. Equalization of the energizing forces applied to the three brakes is thus insured. However, it will be understood that if it is desired to apply unequal brake torque to the rolls, e.g., a progressively increasing brake torque for each successive roll, the center of pressure may be located accordingly.

The diaphragm 36 is peripherally secured and sealed upon a circular flange 38 formed in a cover plate 40, by means of a sealing ring 42 and screws 44. An expansible chamber 46 is thus formed between the diaphragm and cover plate, and a controllable brake actuating force is applied by fluid pressure through a conduit 48 communicating with the expansible chamber. The cover plate is mounted in fixed relation to the brake housing 18 by means of elongated bosses 50, which are cast unitarily in the brake housing, and screws 52 threaded in these bosses.

Since the tension rolls are not positively drivingly interconnected, and their angular speeds may consequently differ, curvature or eccentricity of any roll is accommodated by an individual variation in angular velocity, to maintain equality of the linear surface velocities of all the rolls with the linear velocity of the web. Variations in web tension from this cause are thus avoided.

Figure 6:
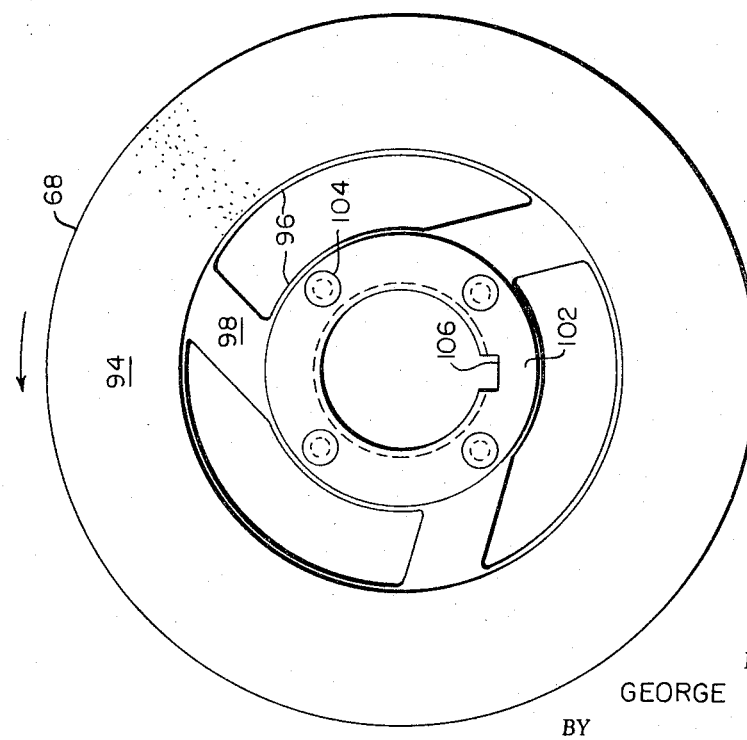
FIG. 6 is a view in elevation of a disc forming an element of the disc brake of FIG. 4.

Conventional brakes tend to introduce pulsations in braking torque when there is run-out of the brake drum surfaces. To further improve the uniformity of web tension, the disc brakes 30 are preferably of an improved type, of which a first embodiment is shown on an enlarged scale in FIGS. 4–6. Each brake comprises a pair of drums 60 and 62 having radial braking surfaces 64 and 66 opposed to one another, between which is interposed a brake disc 68. The drum 62 is formed with peripherally-spaced mounting bosses 70, having tapped openings 72 for receiving the mounting screws 31 as previously described. One of the stub shafts 22 is received within a hub 74 of the drum 62, and is keyed at 76 in axially-slidable rotary driving engagement with the disc 68. Each drum is provided with cooling flanges 78, although it will be understood that a liquid cooling system may be used alternatively where relatively high heat-horsepower ratings are required.

An actuating stud 80 is affixed in a hub 82 of the drum 60, for application of a brake energizing force along the longitudinal axes of the brake and the shaft 22. As in conventional disc brakes, braking is accomplished by moving the drum 60 along the brake axis to engage the drum surfaces 64 and 66 with the disc 68.

In conventional practice, however, relative rotation of the movable drum 60 is prevented by stop means which are slidable to permit the axial brake-actuating movement. Such means prevent relative canting movement between the two drums, which is necessary to maintain uniform braking torque when the drum surfaces 64 and 66 do not conform substantially to true planes. I overcome this difficulty by peripherally interconnecting the drums only by means of U-shaped leaf springs 84, secured to ears 86 and 88 of the respective drums by bolts 90 and nuts 92. These leaf springs are sufficiently extensive in the peripheral direction to support the drum 60 against excessive angular displacement under the applied brake torque, but transversely flexible to accommodate the actuating movement. At the same time, they permit relative canting of the drums to provide improved uniformity of brake torque when there is run-out of the drum surfaces.

The disc 68 is provided in a conventional manner with a pair of bonded rings of friction material 94 for engaging the drum surfaces, and comprises a stamping having openings 96, defined between arms 98 connecting a peripheral portion with a hub portion. Arms 98 provide torsional stiffness with axial flexibility. Thus, in operation, disc 68, as it rotates against drum 62, can conform to any departure of the drum surface from a plane perpendicular to the axis of rotation. However, within the broader aspects of the invention, the disc may be rigid, especially where both drums are floatingly mounted. In the preferred embodiment, the disc is such as to flex for permitting relative canting and/or axial movement of the peripheral drum-engaging portion for conformity with the drum surfaces. A pair of rings 102 are riveted to the hub as at 104, to mount the disc on the shaft 22 and provide a key-way 106 for the key 76.

Figure 9:
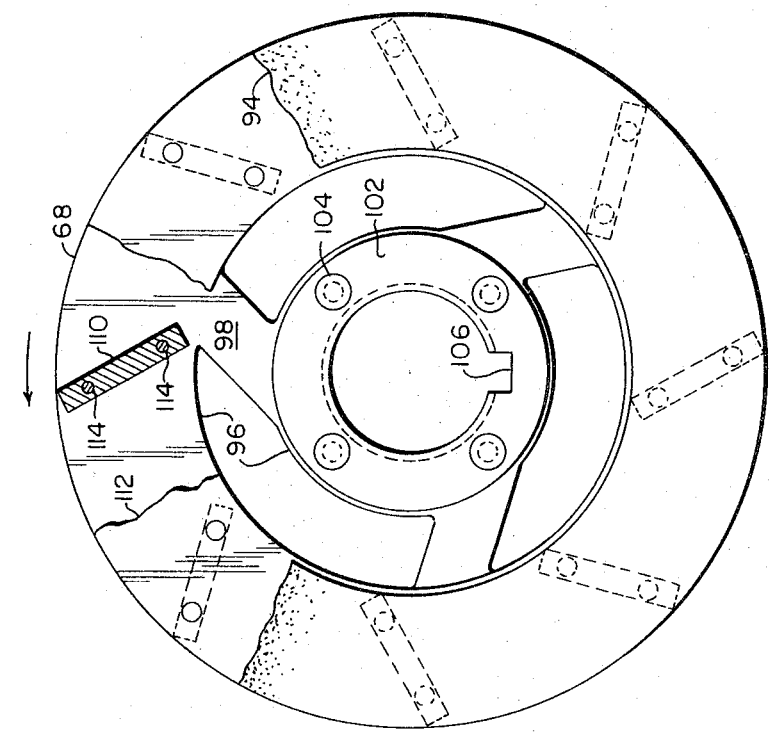
FIG. 9 is a fragmentary view in elevation of the disc construction of the brake of FIG. 7.

A modified form 30a of the improved disc brake is shown in FIGS. 7–9, in which similar parts are correspondingly numbered. In this form, forced cooling air circulation is obtained by incorporating an air impeller in the brake disc. Impeller vanes 110 are interposed between the disc 68 and a further annular disc 112, the assembly being secured by rivets 114. Air is admitted to the interior of the brake through openings 115 and 116, spaced between the cooling fins 78 of the drums 60 and 62, respectively. Bushings 118 are provided between the drum 62 and the springs 84, to accommodate the enlarged disc. Air circulation takes place in the direction shown by the arrows in FIG. 7. I have found that this arrangement further increases the permissible heat-horsepower rating of the improved disc brake. Alternatively, external forced air circulation means may be utilized to the same end.

Figure 12:
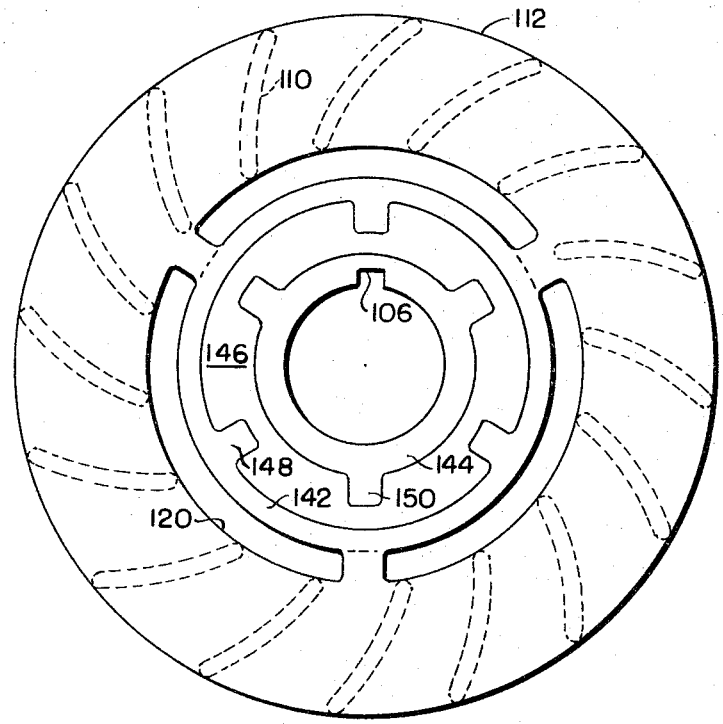
FIG. 12 is a view in elevation of a disc element of the brake of FIG. 10.

In another embodiment shown in FIGS. 10–12, in which parts similar to those of the foregoing embodiments are again correspondingly numbered, forced cooling air circulation is again obtained, by incorporating impeller vanes 110 between the discs 68 and 112. The discs and vanes are formed as a single casting of suitable material such as aluminum. Arcuate cooling air openings 120 pass the air flow serially from the openings 115 and 116 to the vanes.

In this embodiment, the axially-extensible means connecting the drums 60 and 62 comprise track-and-ball arrangements including a plurality of V-blocks 124, having axially-extending V-shaped grooves 126, and corresponding V-blocks 128 formed with parallel grooves 130. The blocks 124 are peripherally spaced about the drum 62 in alignment with the bosses 70, being secured by machine screws 132, while the blocks 128 are welded to, or cast as an integral portion of, the drum 60. Balls 122 are entrapped in the mating grooves by stops 134, secured at the outer ends of the V-blocks 124 by screws 136, and by stops 137 formed in the V-blocks 128. The drums are biased apart, normally to de-energize the brake, by compression springs 138 received in recesses 140. The drums are thus restrained against relative circumferential movement, but are free for axial movement, and for such canting as may be required to bring about uniform surface contact with the brake disc.

The discs 68 and 112 are given some flexibility for canting and angular movement with respect to the shaft 22 by interconnecting a ring portion 142 of the disc casting, and a separate interval hub 144, by means of an elastomeric coupling ring 146. The ring portion 142 has circumferentially-spaced teeth 148 projecting inwardly, while the hub has outwardly projecting teeth 150 at circumferentially-spaced intervals, both received in mating recesses of the coupling ring. This arrangement provides for some misalignment of the parts necessary to secure full face contact between the brake elements.

While I have illustrated and described preferred embodiments of my invention, it will be understood by those skilled in the art that various changes and modifications may be made without departing from the true spirit and scope of the invention, which I therefore intend to define in the appended claims without limitation to the details of the foregoing embodiments.

What I claim is:

1. A web tensioning device comprising in combination: three parallel tensioning rolls triangularly arranged for serial wrapping by a traveling web, a plurality of disc brakes each comprising a least one element drivingly connected with one of said rolls and at least another relatively movable element for frictionally engaging said one element, each of said brakes being aligned with the axis of the connected roll, brake-actuating means comprising a spider pivotally engaging said other element of each brake on an individual center located on the axis of the connected roll for simultaneously applying an actuating force to each of said brakes, and means engaging said spider at the center of gravity of a triangle defined by said individual centers for applying a resultant brake-actuating force at said center of gravity, whereby equal actuating forces are applied to each brake.

2. A web tensioning device as recited in claim 1, together with air cooling means for each of said brake comprising impeller vanes mounted on said one element thereof, and openings in said other element thereof forming fluid flow communication between said impeller vanes and the ambient atmosphere.

3. A web tensioning device as recited in claim 1, said one element of each of said brakes comprising a pair of coaxial spaced-apart discs drivingly connected with one of said rolls for transferring braking torque, said one element being axially flexible, and impeller vanes interconnecting said discs at the outer peripheries thereof; said other element of each of said brakes comprising a pair of drums having radial braking surfaces between which said discs are interposed for frictional engagement with said drums by relative movement of the drums toward one another along the brake axis, said drums having openings providing fluid flow communication between said impeller vanes and the atmosphere.

4. A web tensioning device as recited in claim 1, in which said one element of each of said brakes comprises a disc element drivingly connected with one of said rolls, and said other element of each of said brakes comprises at least one drum having a radial braking surface adjacent said disc element for frictional engagement therewith by relative movement of the drum along the brake axis; mounting means; and a plurality of support means peripherally spaced about and interconnecting said drum with said mounting means, said support means being extensible along the axis of the disc and the connected roll for restraining said drum against relative angular displacement while permitting the radial braking surface thereof to engage fully with said disc element by relative canting.

5. A web tensioning device as recited in claim 4, in which said support means comprise cooperating track means on said drum and said mounting means, said track means extending parallel to the roll axes, and balls axially movable in said track means.

6. A disc brake comprising, in combination: disc means supported on a rotatable shaft for transferring braking torque; at least one drum having a radial braking surface adjacent said disc means for frictional engagement along the brake axis; mounting means; and support means interconnecting said drum with said mounting means, said support means being extensible along the axis of said disc means, and being constructed and arranged for restraining said drum against angular displacement while permitting relative axial and canting movement of said drum for engagement with said disc means, said support means comprising track means extending parallel to said brake axis and balls movable along said track means.

7. A disc brake comprising a disc, at least one drum having a radial braking surface, mounting means, said disc and said drum being supported for relative movement along the disc axis into frictional engagement, cooperating track means on said drum and said mounting means, and a plurality of balls received in said track means to form a sole mounting for said drum to restrain said drum against angular displacement while permitting axial and canting movement of said drum along said disc axis for actuation of the brake.

8. A disc brake as recited in claim 6, in which said disc means comprises a pair of coaxial spaced-apart discs and impeller vanes interconnecting said discs; said drum and said mounting means providing openings for fluid flow communication between said impeller vanes and the atmosphere.

9. A disc brake as recited in claim 6, together with brake-actuating means pivotally engaging said drum on a center located on said brake axis.

(References on following page)

References Cited by the Examiner

UNITED STATES PATENTS

| | | | |
|---|---|---|---|
| 1,717,522 | 6/1929 | Rosenberg | 188—264 |
| 1,986,776 | 1/1935 | Moore | 242—75.2 X |
| 2,105,867 | 1/1938 | Stewart | 188—72 |
| 2,115,763 | 5/1938 | Burke | 188—254 X |
| 2,165,978 | 7/1939 | Miller | 188—264 |
| 2,417,856 | 3/1947 | Barish | 188—71 |
| 2,897,574 | 8/1959 | Sanders | 26—10 |
| 3,044,579 | 7/1962 | Klaue | 188—72 |

FOREIGN PATENTS

| | | |
|---|---|---|
| 239,862 | 4/1926 | Great Britain. |
| 373,592 | 6/1932 | Great Britain. |
| 1,007,936 | 2/1952 | France. |
| 1,151,696 | 8/1957 | France. |

STANLEY N. GILREATH, *Primary Examiner.*